United States Patent
Volante et al.

(10) Patent No.: US 11,069,042 B2
(45) Date of Patent: Jul. 20, 2021

(54) BLADED ROTATING ASSEMBLY MITIGATION IN HIGH FRAME RATE VIDEO

(71) Applicant: BAE SYSTEMS Information and Electronic Systems Integration Inc., Nashua, NH (US)

(72) Inventors: Jackson W. Volante, Merrimack, NH (US); Thomas E. Nielson, Westford, MA (US); Katharine S. Steer, Newmarket, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 110 days.

(21) Appl. No.: 16/720,404

(22) Filed: Dec. 19, 2019

(65) Prior Publication Data

US 2021/0192702 A1 Jun. 24, 2021

(51) Int. Cl.
| | |
|---|---|
| *G06T 5/30* | (2006.01) |
| *G06K 9/62* | (2006.01) |
| *G06T 5/00* | (2006.01) |
| *H04N 5/357* | (2011.01) |
| *G06T 3/40* | (2006.01) |
| *G06T 1/60* | (2006.01) |

(52) U.S. Cl.
CPC .............. *G06T 5/30* (2013.01); *G06K 9/6202* (2013.01); *G06T 1/60* (2013.01); *G06T 3/40* (2013.01); *G06T 5/002* (2013.01); *H04N 5/357* (2013.01)

(58) Field of Classification Search
CPC .. G06T 5/30; G06T 5/002; G06T 3/40; G06T 1/60; G06K 9/6202; H04N 5/357
See application file for complete search history.

(56) References Cited

U.S. PATENT DOCUMENTS

| | | | |
|---|---|---|---|
| 2011/0255004 A1 | 10/2011 | Tran et al. | |
| 2016/0350936 A1* | 12/2016 | Korchev | ................ H04N 5/332 |
| 2019/0045193 A1 | 2/2019 | Socek et al. | |
| 2019/0304102 A1* | 10/2019 | Chen | .................... G06K 9/6271 |

OTHER PUBLICATIONS

International Search Report, PCT/US20/65264, dated Apr. 16, 2021, 7 pages.

* cited by examiner

*Primary Examiner* — Casey L Kretzer
(74) *Attorney, Agent, or Firm* — KPIP Law, PLLC

(57) ABSTRACT

The system and method of frame differencing in high frame rate video to mitigate distortion caused by a bladed rotating assembly in the high frame rate video. The system and method applies one or more thresholds and a scaling factor and use a buffer of pixel values to mitigate distortions caused by blades as they pass in front of an imager.

20 Claims, 4 Drawing Sheets

BLADED ROTATING ASSEMBLY MITIGATION IN HIGH FRAME RATE VIDEO

STATEMENT OF GOVERNMENT INTEREST

This disclosure was made with United States Government support under Contract No. W58RG2-18-C-0001 awarded by the United States Army. The United States Government has certain rights in this invention.

FIELD OF THE DISCLOSURE

The present disclosure relates to high frame rate video and more particularly to bladed rotating assembly mitigation in high frame rate video.

BACKGROUND OF THE DISCLOSURE

There are certain imaging applications where it is desirable to remove temporary obstructions from the field of view. One such application is related to imaging from a helicopter where the blades obscure at least some portion of the field of view and creates a blind spot. Prior systems used to mitigate distortion from bladed rotating assemblies in high frame rate video used a set of preprogrammed sets of pixels that the rotor blade would occupy. In the frame difference method, the system would search across a particular row of a frame differenced pixels looking for the pixels having the highest value (e.g. intensity). Using the highest value, the system would select a rotor blade position from the set of preprogrammed positions and replace any pixels that had been marked as containing a rotor blade in that set with pixels from the previous frame in the frame differencing algorithm to "remove" the blade from the resulting image. This method has several problems. First, the system is very difficult to configure correctly, as someone implementing the system would need to find all possible pixels containing the rotor blade for any possible location of the highest pixel values in the differenced image. Second, the system could detect a wrong position for the rotor blade if another object moved quickly across the field of view of the imager. Third, the system could fail if the rotor blade were to flex or distort in such a way that it was not captured by the preprogramed positions. These problems are all resolved by the new method described herein.

Wherefore it is an object of the present disclosure to overcome the above-mentioned shortcomings and drawbacks associated with the conventional processing of high frame rate video using an imager positioned behind a bladed rotating assembly.

SUMMARY OF THE DISCLOSURE

One aspect of the present disclosure is a method of frame differencing in high frame rate video, comprising: providing at least one imager configured to collect high frame rate video, wherein high frame rate video is characterized by video with a frame rate greater than 100 Hz; determining a difference between a plurality of pixels in a current frame of the at least one imager and a plurality of pixels in an separate frame that is a number of frames previous to the current frame resulting in a plurality of differenced pixels; applying a lower threshold to the plurality of differenced pixels, wherein the lower threshold is based on a minimum frame to frame noise value for the at least one imager; categorizing the plurality of differenced pixels that remain following the application of the lower threshold as potentially detected pixels; eroding a kernel; dilating the kernel; marking the potentially detected pixels as detected pixels following the dilation step; providing a buffer comprising values provided from each set of frames, the buffer having a maximum capacity; removing the oldest value from the buffer of values if the maximum capacity would be exceeded by the addition of a new value; and adding a highest detected value from the plurality of detected pixels to the buffer after multiplying by a scaling factor.

One embodiment of the method of frame differencing in high frame rate video is wherein the method mitigates distortion caused by a bladed rotating assembly in the high frame rate video.

In some embodiments, the method of frame differencing in high frame rate video further comprises applying an upper threshold to the plurality of pixels in the current frame. In some cases, the upper threshold removes any intensities greater than 10000.

Another embodiment of the method of frame differencing in high frame rate video is wherein the number of frames between which a difference is determined is based on the angular rate of rotation of the bladed rotating assembly. In certain cases, the method of frame differencing in high frame rate video further comprises a requirement that a difference between pixels in an image is greater than zero.

Another embodiment of the method of frame differencing in high frame rate video further comprises applying a subsequent threshold based on prior potentially detected pixels wherein the subsequent threshold is some fraction of a lowest pixel value in the buffer. In some cases, the lower threshold defaults to fourteen when no other imager information is available.

Yet another embodiment is wherein eroding a kernel comprises two iterations of kernel erosion. Another embodiment is wherein dilating the kernel comprises two iterations of kernel dilation.

Still yet another embodiment of the method of frame differencing in high frame rate video is wherein all pixel values that meet thresholding criteria are marked as detected pixels. In some cases, the system is implemented on an FPGA.

Another embodiment of the method of frame differencing in high frame rate video is wherein the number of frames between the current frame and the previous frame in the frame differenced image is a positive integer based on how many frames pass between a blade entering one pixel of the image and leaving that same pixel, limited by the number of frames a processor can store in memory.

In certain embodiments, an initial threshold is a positive value representing the smallest possible intensity measurement of a blade in the at least one imager. In some cases, an erosion size is a positive integer number of pixels based on a smallest one dimensional cross section of a blade appearing in the at least one imager, not larger than half of a smallest dimension of the at least one imager resolution. In certain cases, a dilation size is a positive integer number of pixels that is the same size or larger than the erosion size and is smaller than the resolution of the at least one imager.

In yet another embodiment of the method of frame differencing in high frame rate video, the scaling factor is between 0 and 1 and when multiplied by a highest intensity pixel measurement of a blade in the differenced image, produces a smallest intensity measurement of a pixel that the blade occupies in the differenced image which is not smaller than a $1^{st}$ standard deviation of noise for pixels in the at least one imager. In certain cases, more than one blade is visible at a time in an image.

One embodiment of the method of frame differencing in high frame rate video is wherein the capacity of the buffer is a six. In some embodiments, a threshold for a subsequent frame is 10% of the lowest value in the buffer.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

DETAILED DESCRIPTION OF THE DISCLOSURE

One embodiment of the bladed rotating assembly mitigation in high frame rate video system of the present disclosure removes aircraft rotor images from high frame rate video. In certain embodiments, this system can be used on any system processing video imagery that desires the removal of a moving bladed rotating assembly from its field of view. In certain embodiments, the system is designed for helicopter main rotors and tail rotors. In some cases, the system works on fixed wing, propeller driven aircraft as well.

Figure 1:
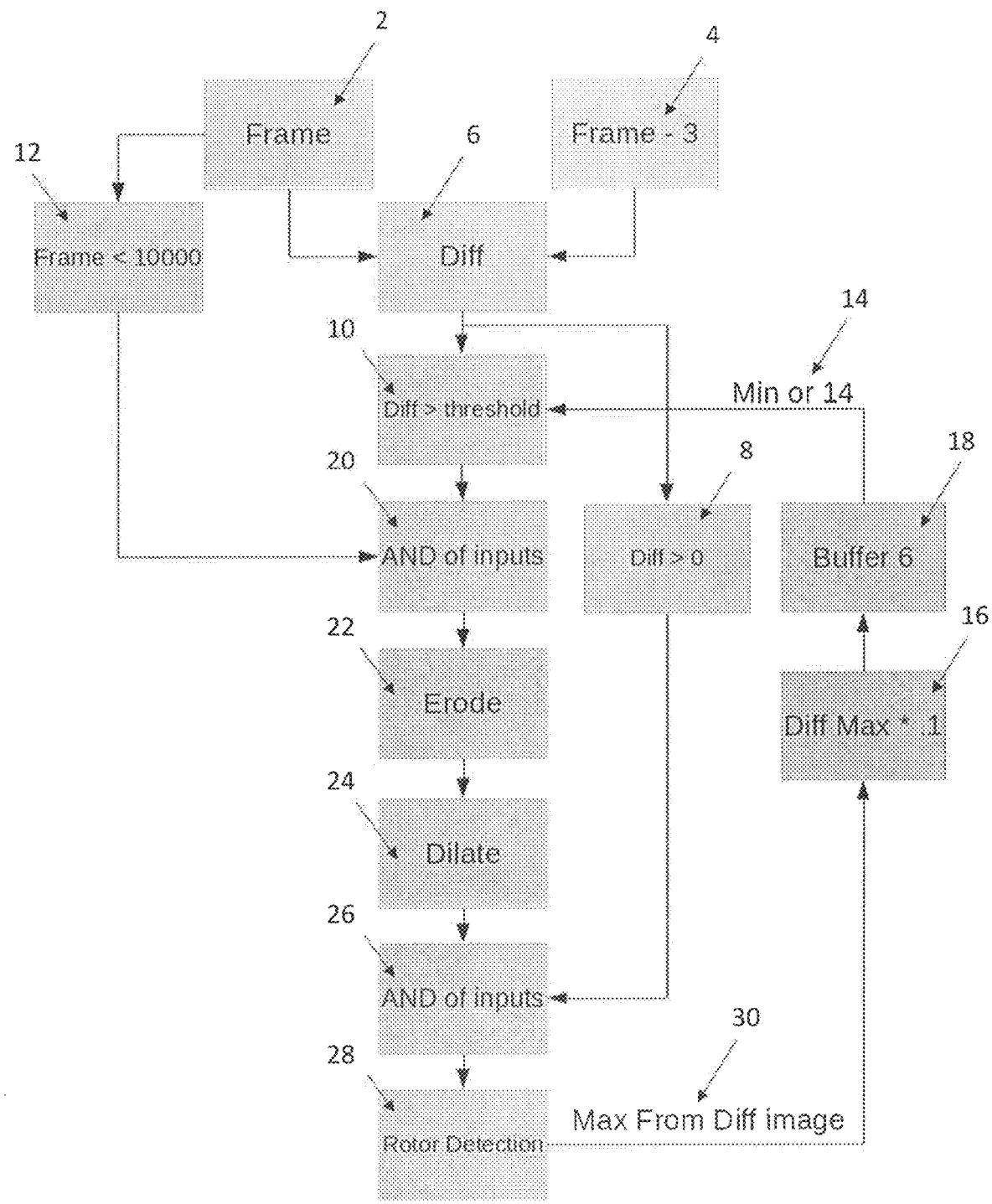
FIG. 1 is a flow chart of one embodiment of a method of bladed rotating assembly mitigation in high frame rate video according to the principles of the present disclosure.
Figure 2A:
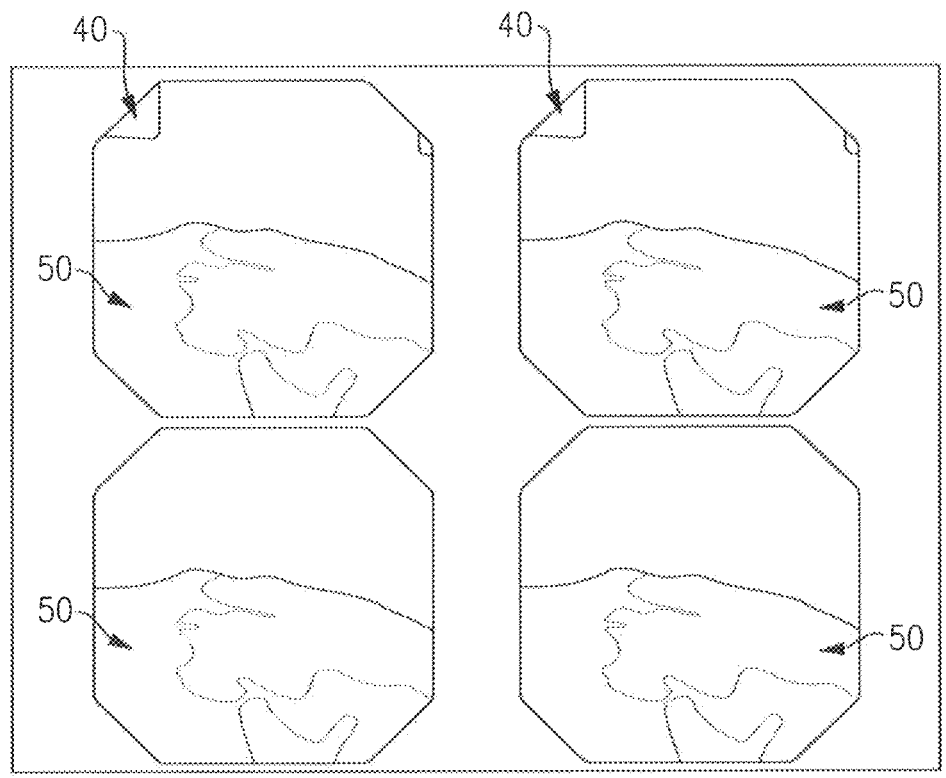
FIG. 2A-FIG. 2D show progressive frames with and without the method of bladed rotating assembly mitigation in high frame rate video of the present disclosure for a main rotor.
Figure 2B:
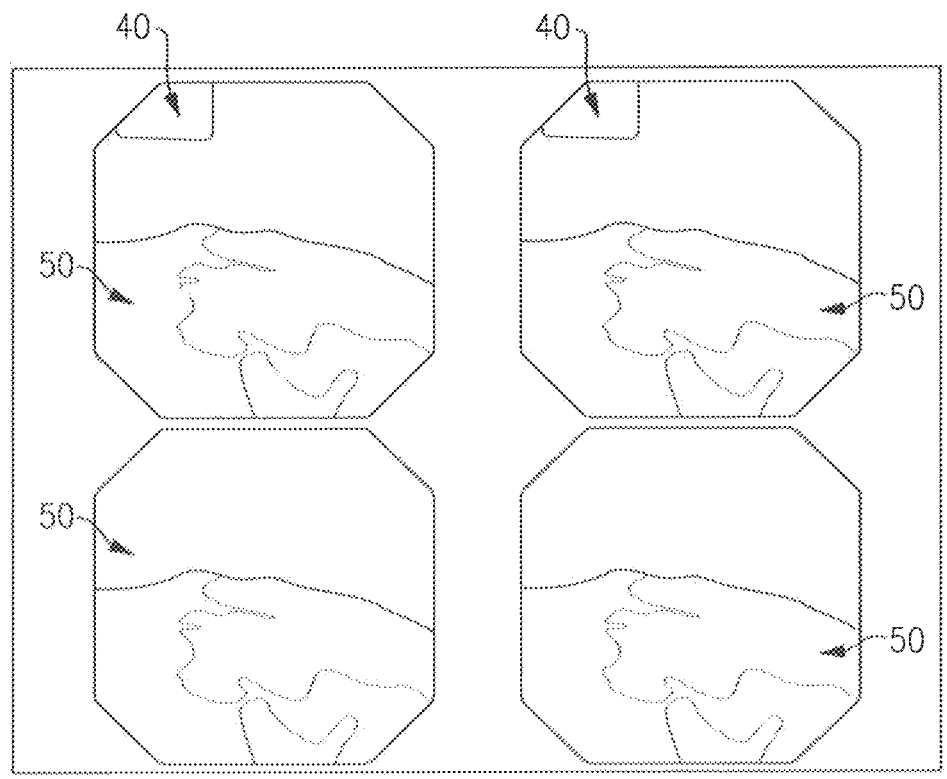
Figure 2C:
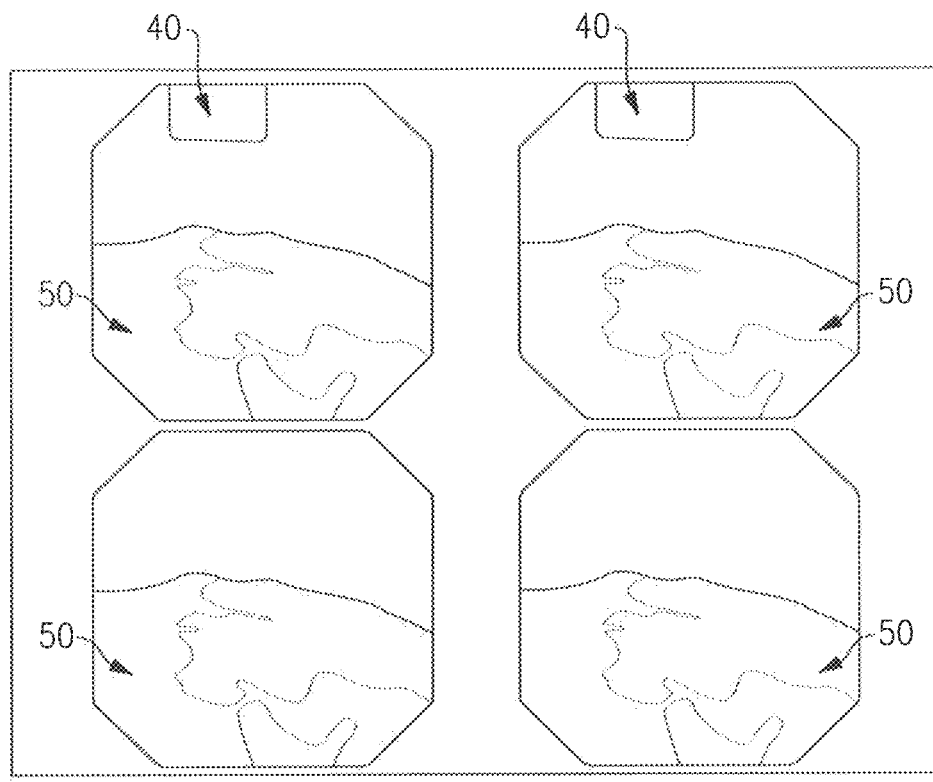
Figure 2D:
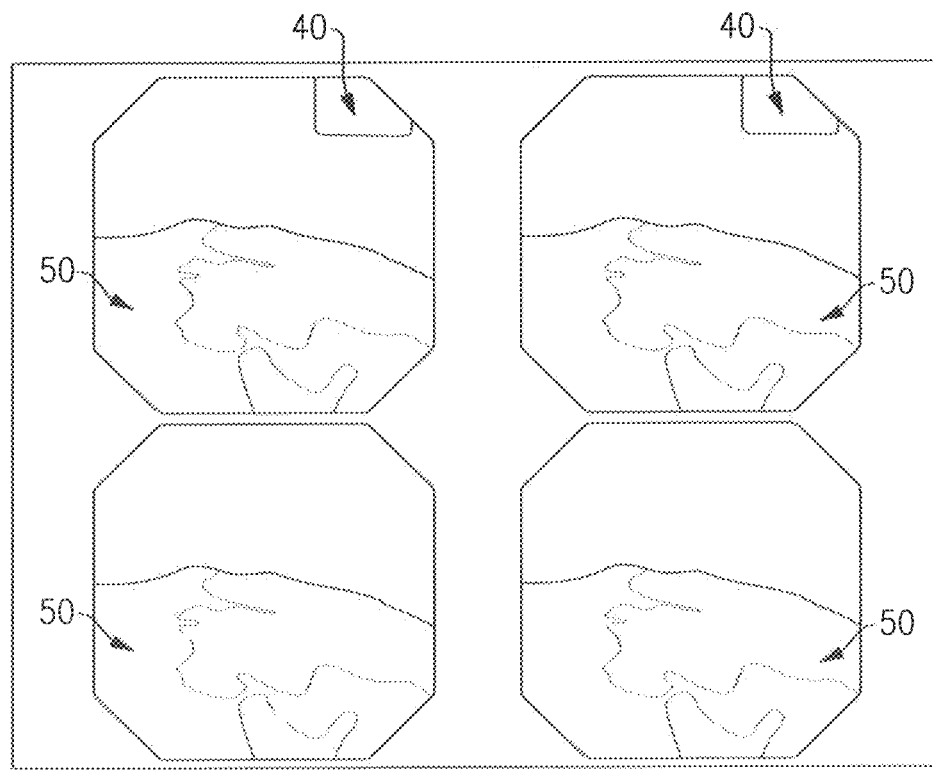

Referring to FIG. 1, a flow chart of one embodiment of a method of bladed rotating assembly mitigation in high frame rate video according to the principles of the present disclosure is shown. More specifically, one embodiment of a method of bladed rotating assembly mitigation in high frame rate video is based on a frame differencing algorithm to find the bladed rotating assembly within the field of view of an imager capable of imaging at 100 Hz or more. The specific frame rate can vary, as long as the signal of the artifact the algorithm is trying to remove is present in a given position for an amount of time that's less than or equal to the time it is not present in an image. As the frame rate decreases, the object gets smeared across more pixels of the image, effectively changing the ratio of the time the signal is present versus the time it is not present. In one example, the ratio of (time signal present)/(time signal not present) is less than or equal to 1.

In one embodiment, the difference 6 between a current frame 2 and a previous that is prior to the current frame 4 is determined. In one example the previous frame is between two and five frames from the current frame. In another embodiment the previous frame is three frames from the current frame. The number of frames between which a difference is determined is specific to a particular platform or application (e.g., helicopter, plane) and is based on the angular rate of rotation of the bladed rotating assembly. The goal is to avoid overlap, and instead have a clear difference between a blade of the bladed rotating assembly being present and not being present at a particular location within an image. In this example, the requirement that the difference between images being greater than zero 8 is based on the assumption that the blade will be "brighter" or of higher intensity than the background. In contrast, when the value of the pixel drops below the value of the pixel in the prior image, one assumes there is no blade. In certain embodiments, any potential detections are removed where the frame difference is negative.

In some embodiments, a threshold is applied based on previously detected values 10 and a comparison is made of the difference value to the threshold. In one embodiment, the lowest threshold applied corresponds to the minimum bit value for the particular sensor 14. In one example, the minimum bit value is fourteen or sixteen, but the system can be adapted for whatever sensor is used in the system. In some cases, the minimum threshold defaults to fourteen when no other sensor information is available. In addition, the current frame 2 is also checked as to the intensity level 12. Intensity levels less than a threshold level in the current frame may be an input to further processing. In one example, the threshold of 10000 is applied to the current frame.

Still referring to FIG. 1, in certain embodiments the highest detected value 30 is added to a buffer 18. In certain embodiments, the buffer is a six value buffer. In other cases, another number of values for the buffer may be used. In some embodiments of the system of the present disclosure, a threshold for a subsequent frame is approximately 10% of the lowest value 16 in the buffer 18. In step 20, all the pixel values that have been considered and meet the thresholding criteria are fed into an erode step 22. In one example there are two iterations of 5×5 kernel erosion to shrink the values. The values that have been subject to the erode process 22 are then processed for dilation 24. In one example, two iterations of 13×13 kernel dilation are used to blow up the values to larger than they were before to help eliminate noise in the image. In step 26, all the pixel values that meet the thresholding criteria (e.g., minimum intensity, erosion and dilation) are then marked as blade detections 28.

In certain embodiments of the blade mitigation system of the present disclosure, the initial blade shape is obtained by thresholding a frame differenced image. The algorithm then takes advantage of the blade size by using morphological processing to remove smaller artifacts in the image. A new threshold is then calculated for the next detection by using values from previous detections. If the imagery is down sampled, the blade can be removed by excluding detected pixels from the down sampling. If the imagery is not down sampled, the blade can be removed by replacing the pixels with the values in the previous image used for frame differencing.

In certain embodiments, the system is implemented on computer hardware. In some cases, the system is implemented on an FPGA. The system of the present disclosure requires minimal configuration per platform. In contrast, prior solutions required hundreds of blade positions to be specified ahead of time. The present system only requires five parameters to be configured: the number of frames between the current frame and the previous frame in the frame differenced image (a positive integer based on how many frames pass between the blade or propeller entering one pixel of the image and leaving that same pixel, limited by the number of frames the processor can store in memory); the initial threshold (a positive value representing the smallest possible intensity measurement of the blade in the imager); the erosion size (a positive integer number of pixels based on the smallest one dimensional cross section of the blade appearing in the imager, not larger than half of the smallest dimension of the imager resolution); the dilation size (a positive integer number of pixels that is the same size or larger than the erosion size and smaller than the resolution of the imager), and the scaling factor for updated thresholds (between 0 and 1 that when multiplied by the highest intensity pixel measurement of the blade in the differenced image, produces the smallest intensity measurement of a pixel that the blade occupies in the differenced image that is not smaller than the $1^{st}$ standard deviation of noise of pixels in the imager). The present system also works on sensor configurations where more than one blade is visible at a time.

The blade mitigation system of the present disclosure affects fewer pixels in the output imagery where previous solutions would change entire columns, this approach only affects pixels that have a blade present in them. Certain embodiments of the system work with blades that move vertically through the image. Prior systems only worked with blades moving horizontally through the image. The system is hardened against changes in mounting and blades flexing out of their normal positions due to detecting where the blade is in the image, rather than using preprogramed positions. Prior systems would fail to remove the blade properly if the sensor mountings shifted or the blade flexed outside of expected locations.

In some cases, parameters may need to be re-evaluated or may need different morphological processing parameters for removal of a tail rotor blade and a main rotor blade when used for a helicopter. In some cases, parameters may need to be re-evaluated when a blade is visible close to the hub, due in part to it not moving fast enough. The scaling factor used when calculating new thresholds may need to be changed to accommodate for noise in the sensor. The algorithm will work as long as the period of time where signal from an artifact is present is at least as long as the time where no signal from an artifact is present, and sensor noise is not too large to accurately detect the artifact with a differenced image.

Referring to FIG. 2A-FIG. 2D, progressive frames with and without the method of blade mitigation in high frame rate video of the present disclosure for a main rotor are shown. More specifically, the two upper frames in the each figure represent the raw video stream showing visual interference of the main rotor blade for the platform blocking some of the field of view of the sensor. The two bottom frames in the each figure represent processed video using one embodiment of the method of blade mitigation in high frame rate video of the present disclosure showing the removal of the visual interference of the main rotor blade for the platform in the field of view of the sensor. The progressive frames are used to show that the blade moves across various pixels in each of the many frames.

Figure 3A:
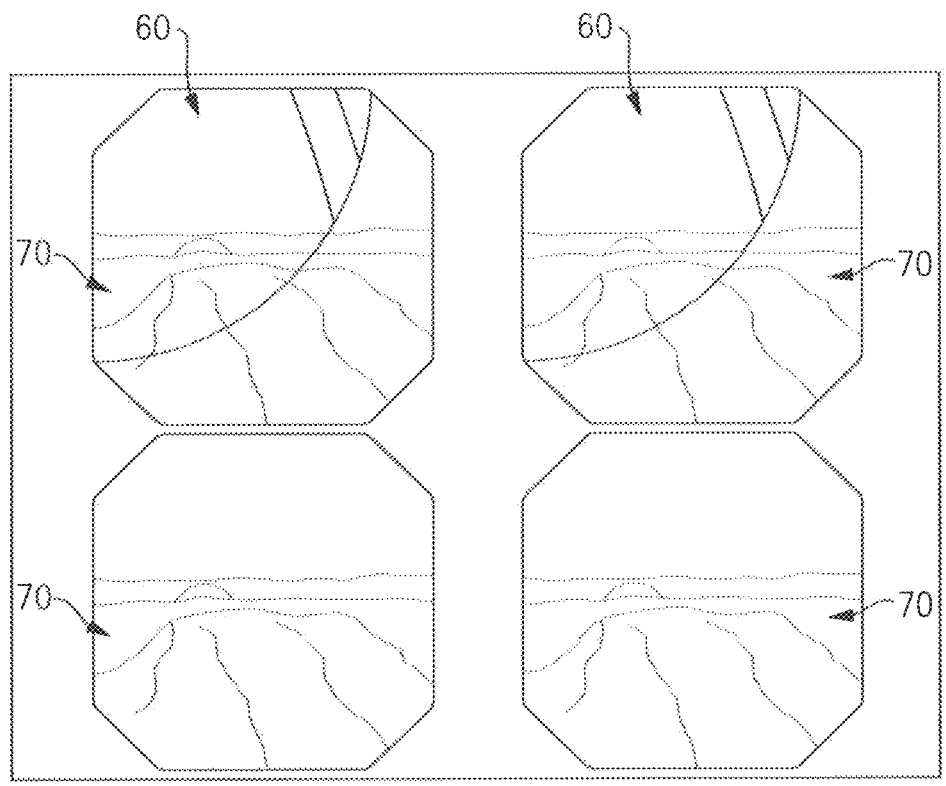
FIG. 3A and FIG. 3B show progressive frames with and without the method of bladed rotating assembly mitigation in high frame rate video of the present disclosure for a tail rotor.
Figure 3B:
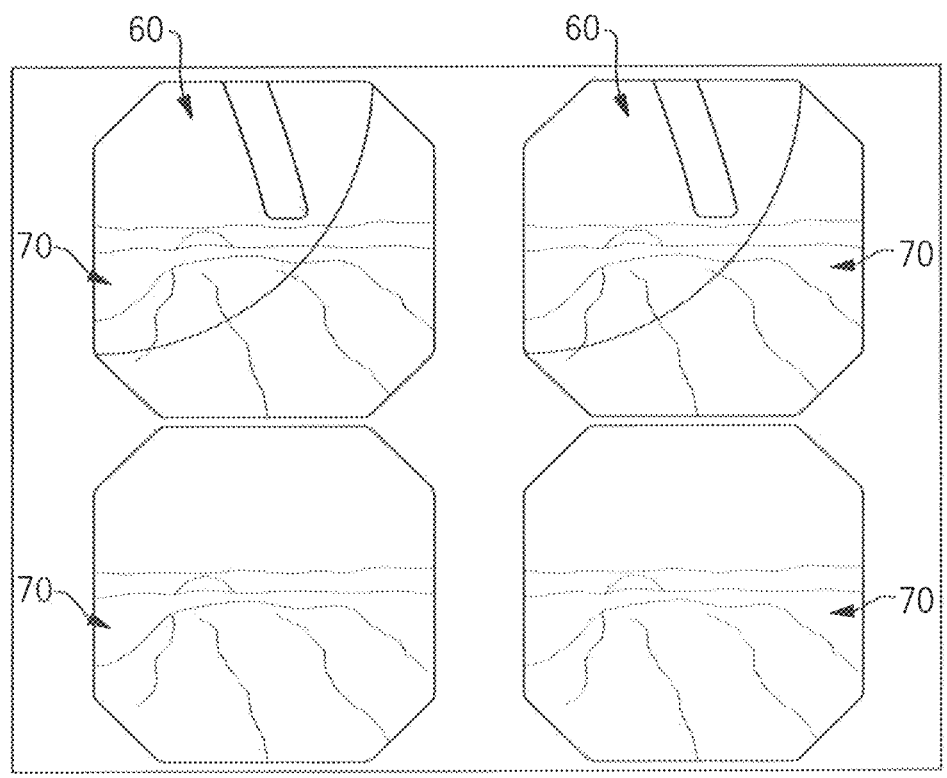

Referring to FIG. 3A and FIG. 3B, progressive frames with and without the method of blade mitigation in high frame rate video of the present disclosure for a tail rotor blade are shown. More specifically, the two upper frames in the each figure represent the raw video stream showing visual interference of the tail rotor blade for the platform blocking some of the field of view of the sensor. Here, there is an arcuate shadow and another semicircular portion obscuring most of the field of view of the sensor. The two bottom frames in the each figure represent processed video using one embodiment of the method of blade mitigation in high frame rate video of the present disclosure showing the removal of the visual interference of the tail rotor blade for the platform in the field of view of the sensor. The progressive frames are used to show that the blade moves across various pixels in each of the many frames.

One embodiment of the method and system of the present disclosure mitigates blurred or obscured regions in the field of view of sensors on platforms with bladed rotating assemblies that capture high frame rate video. In certain embodiments, this system is used on any system processing video imagery that desires the removal of a bladed rotating assembly from its field of view. In certain embodiments, the system is designed for helicopter main rotor blades and tail rotor blades. In some cases, the system works on fixed wing, propeller driven aircraft as well.

The computer readable medium as described herein can be a data storage device, or unit such as a magnetic disk, magneto-optical disk, an optical disk, or a flash drive. Further, it will be appreciated that the term "memory" herein is intended to include various types of suitable data storage media, whether permanent or temporary, such as transitory electronic memories, non-transitory computer-readable medium and/or computer-writable medium.

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying Figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A method of frame differencing in high frame rate video, comprising:
    providing a plurality of high frame rate video from at least one imager, wherein high frame rate video is characterized by video with a frame rate greater than 100 Hz;
    determining a difference between a plurality of pixels in a current frame of the at least one imager and a plurality of pixels in an separate frame that is a number of frames previous to the current frame resulting in a plurality of differenced pixels;
    applying a lower threshold to the plurality of differenced pixels, wherein the lower threshold is based on a minimum frame to frame noise value for the at least one imager;
    categorizing the plurality of differenced pixels that remain following the application of the lower threshold as potentially detected pixels;
    eroding a kernel;
    dilating the kernel;
    marking the potentially detected pixels as detected pixels following the dilation step;
    providing a buffer comprising values provided from each set of frames, the buffer having a maximum capacity;
    removing the oldest value from the buffer of values if the maximum capacity would be exceeded by the addition of a new value; and
    adding a highest detected value from the plurality of detected pixels to the buffer after multiplying by a scaling factor.

2. The method of frame differencing in high frame rate video according to claim 1, wherein the method mitigates distortion caused by a bladed rotating assembly in the high frame rate video.

3. The method of frame differencing in high frame rate video according to claim 2, wherein the number of frames between which a difference is determined is based on the angular rate of rotation of the bladed rotating assembly.

4. The method of frame differencing in high frame rate video according to claim 1, further comprising applying an upper threshold to the plurality of pixels in the current frame.

5. The method of frame differencing in high frame rate video according to claim 4, wherein the upper threshold removes any intensities greater than 10000.

6. The method of frame differencing in high frame rate video according to claim 1, further comprising a requirement that a difference between pixels in an image is greater than zero.

7. The method of frame differencing in high frame rate video according to claim 1, further comprising applying a subsequent threshold based on prior potentially detected pixels wherein the subsequent threshold is some fraction of a lowest pixel value in the buffer.

8. The method of frame differencing in high frame rate video according to claim 1, wherein the lower threshold defaults to fourteen when no other imager information is available.

9. The method of frame differencing in high frame rate video according to claim 1, wherein eroding a kernel comprises two iterations of kernel erosion.

10. The method of frame differencing in high frame rate video according to claim 1, wherein dilating the kernel comprises two iterations of kernel dilation.

11. The method of frame differencing in high frame rate video according to claim 1, wherein all pixel values that meet thresholding criteria are marked as detected pixels.

12. The method of frame differencing in high frame rate video according to claim 1, wherein the system is implemented on an FPGA.

13. The method of frame differencing in high frame rate video according to claim 1, wherein the number of frames between the current frame and the previous frame in the frame differenced image is a positive integer based on how many frames pass between a blade entering one pixel of the image and leaving that same pixel, limited by the number of frames a processor can store in memory.

14. The method of frame differencing in high frame rate video according to claim 1, wherein an initial threshold is a positive value representing the smallest possible intensity measurement of a blade in the at least one imager.

15. The method of frame differencing in high frame rate video according to claim 1, wherein an erosion size is a positive integer number of pixels based on a smallest one dimensional cross section of a blade appearing in the at least one imager, not larger than half of a smallest dimension of the at least one imager resolution.

16. The method of frame differencing in high frame rate video according to claim 15, wherein a dilation size is a positive integer number of pixels that is the same size or larger than the erosion size and is smaller than the resolution of the at least one imager.

17. The method of frame differencing in high frame rate video according to claim 1, wherein the scaling factor is between 0 and 1 and when multiplied by a highest intensity pixel measurement of a blade in the differenced image, produces a smallest intensity measurement of a pixel that the blade occupies in the differenced image which is not smaller than a $1^{st}$ standard deviation of noise for pixels in the at least one imager.

18. The method of frame differencing in high frame rate video according to claim 1, wherein more than one blade is visible at a time in an image.

19. The method of frame differencing in high frame rate video according to claim 1, wherein the capacity of the buffer is a six.

20. The method of frame differencing in high frame rate video according to claim 1, wherein a threshold for a subsequent frame is 10% of the lowest value in the buffer.

* * * * *